Figure 1:
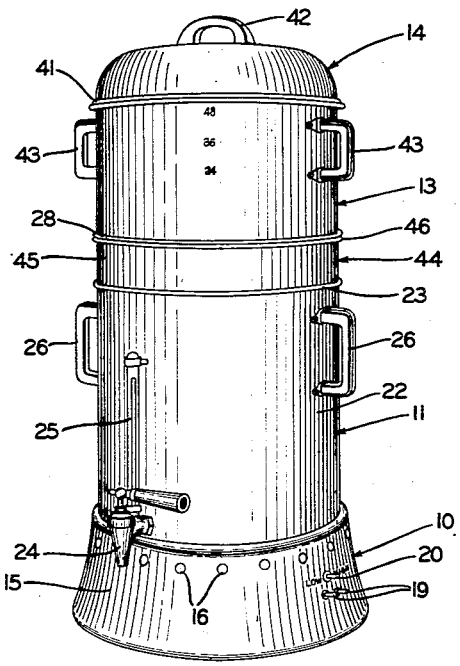

Oct. 15, 1957   G. G. SILL   2,809,577
EXTENSION RING FOR COFFEE URNS

Filed Dec. 1, 1954   2 Sheets-Sheet 1

INVENTOR.
*Gurdon G. Sill*
BY *Frease & Bishop*
ATTORNEYS

United States Patent Office 2,809,577
Patented Oct. 15, 1957

2,809,577

EXTENSION RING FOR COFFEE URNS

Gurdon G. Sill, Massillon, Ohio, assignor to The Enterprise Aluminum Company, Massillon, Ohio, a corporation of Ohio Application December 1, 1954, Serial No. 472,409

2 Claims. (Cl. 99—306)

The invention relates to coffee urns of the drip coffee maker type, and more particularly to a novel extension ring adapted to materially increase the capacity of the urn.

The coffee urn to which the invention refers is of the type which has been manufactured for years by applicant's assignee, The Enterprise Aluminum Company, and is nationally known under the "Drip-O-Lator" trademark.

Such urns are of generally cylindrical form, comprising a base containing an electric heating element, upon which is mounted a liquid coffee reservoir, upon the upper end of which is detachably mounted a perforate ground coffee basket, superimposed by a water container having a perforate bottom and closed at its upper end by a removable cover. The height and diameter of the liquid coffee reservoir determines the capacity of the urn.

The present invention is concerned with an extension ring adapted to be inserted between the top of the liquid coffee reservoir and the ground coffee basket, so as to increase the height of the liquid coffee reservoir and proportionally increase the capacity of the urn.

The invention has as its primary object the provision of such a coffee urn, comprising a liquid coffee reservoir, a perforate ground coffee basket and a water container with perforate bottom, with a detachable extension ring interposed between the top of the liquid coffee reservoir and the perforate ground coffee basket to increase the height of the liquid coffee reservoir and thereby increase the capacity of the urn.

Another object is to provide a simple, inexpensive and efficient means for easily and readily increasing the capacity of a coffee urn of the character referred to.

A further object is the provision of such an extension ring having a peripheral shoulder near its lower edge, for seating upon the rim bead at the upper end of the liquid coffee reservoir, and a rim bead at its upper edge upon which the rim bead of the conventional ground coffee basket may be seated.

The above objects together with others which will be apparent from the drawings and following description, or which may be later referred to, may be attained by constructing the improved extension ring for coffee urns in the manner illustrated in the drawings and hereinafter described in detail.

In general terms, the invention may be stated as comprising a generally cylindrical coffee urn, of the drip coffee type, comprising a base having heating means therein, a liquid coffee reservoir mounted upon the base and having a rim bead at its upper open end, an extension ring having a peripheral shoulder near its lower edge for seating upon the rim bead of the liquid coffee reservoir, the lower portion of the extension ring, below said shoulder, having a sliding fit within the upper end of the reservoir, and an external peripheral bead at the upper edge of the extension ring, upon which the peripheral bead at the upper end of the coffee basket is seated, the upper portion of the ground coffee basket is seated, the upper portion of the ground coffee basket having a sliding fit within the upper end portion of the extension ring, a conventional water container being seated upon the upper end of the ground coffee basket in usual and well known manner and normally closed by a removable cover.

Figure 3:
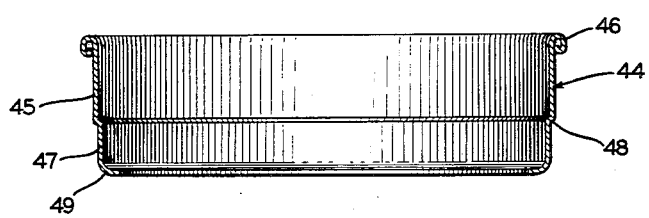
Figure 4:
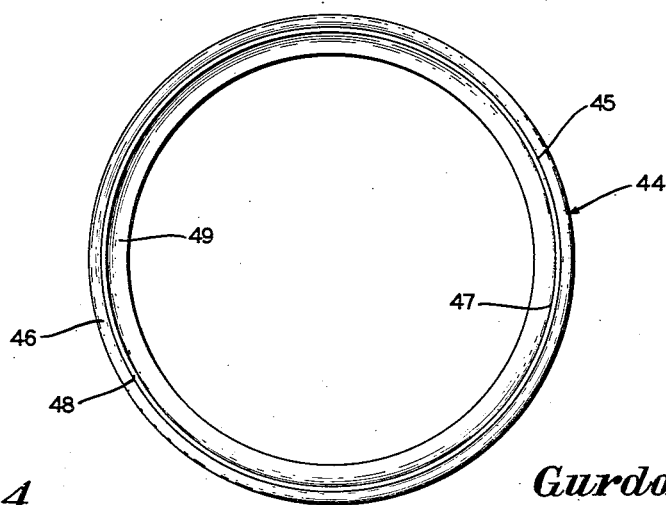
Figure 2:
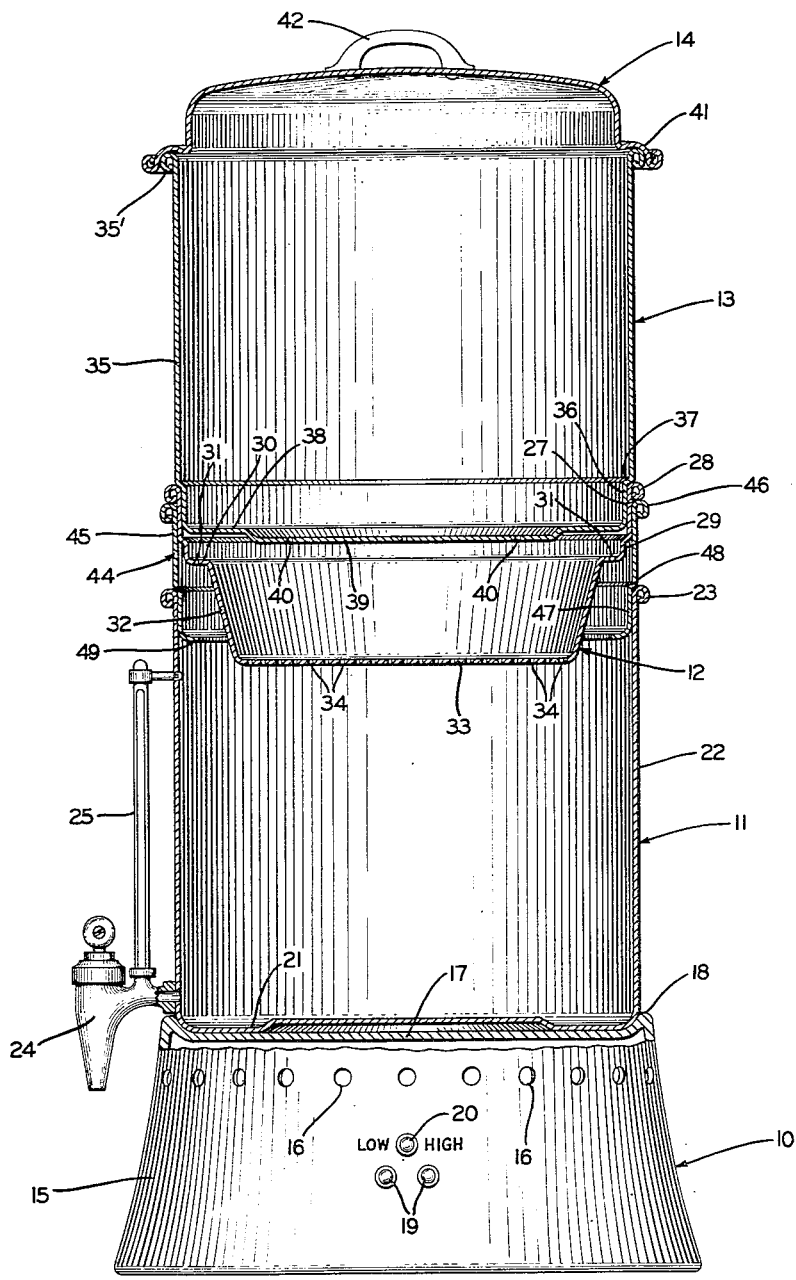

Reference is now made to the embodiment of the invention illustrated in the drawings, in which:

Fig. 1 is a perspective view of a drip type coffee urn provided with the improved extension ring to which the invention pertains;

Fig. 2 a vertical, sectional view through the coffee urn, with extension ring applied thereto, upon a considerably larger scale than Fig. 1;

Fig. 3 a detached, transverse, sectional view of the extension ring to which the invention pertains; and, Fig. 4 a detached, top plan view of the extension ring.

Referring now more particularly to the embodiment of the invention illustrated, in which similar numerals refer to similar parts throughout, the drip type coffee urn, to which the improved extension ring is adapted to be applied, comprises the base indicated generally at 10, the substantially cylindrical liquid coffee reservoir indicated generally at 11, the perforate ground coffee basket indicated generally at 12, the substantially cylindrical water container illustrated generally at 13, and the removable cover therefor, indicated generally at 14.

The base 10 may be formed of aluminum or other sheet metal as in usual practice, and may be in the form of a truncated cone, as indicated at 15, provided with a plurality of ventilating apertures 16 near its upper closed end 17 which forms a flat table or platform upon which the liquid coffee reservoir 11 may be supported, a peripheral rib 18 being formed at the top of the base for surrounding the lower end of the reservoir and preventing displacement thereof.

Any suitable electric heating element (not shown) is located within the hollow base 10, as in conventional practice, and is adapted to be connected to a power line by the usual flexible cord provided for such purposes and having the conventional connector plug adapted to be attached to the plug-in points 19, as in usual and well known manner. The electric heating element may be controlled by a conventional switch indicated generally at 20.

The liquid coffee reservoir 11 may be formed of sheet metal, or other suitable material, having the bottom 21 adapted to rest upon the top 17 of the base, and the cylindrical side wall 22 terminating at its upper end in the external rim bead 23.

The usual faucet 24 is attached to the lower portion of the liquid coffee reservoir 22 for dispensing the hot coffee beverage therefrom, and a sight gauge 25 may be attached, as in usual practice, so as to indicate the amount of coffee beverage in the reservoir.

Conventional handles 26 may be attached to the reservoir 11, as in usual practice, for manipulating the same to remove the reservoir from the base for cleaning and the like and replacing it thereon.

The coffee basket, indicated generally at 12, is of conventional form comprising the cylindrical upper portion 27 with outturned rim bead 28 at its upper edge for normally seating upon the rim bead 23 at the top of the reservoir 11.

The ground coffee basket is inwardly offset, as at 29, below the cylindrical portion 27, forming a flat shoulder 30 which may be perforated in usual and well known manner, as indicated at 31, to accommodate any overflow.

Below the flat shoulder 30, the coffee basket may, as in usual practice, comprise the depending, frusto-conical portion 32 having the flat bottom wall 33 provided with a multiplicity of perforations, as indicated at 34.

The water container 13 comprises the cylindric side wall 35 with out-turned rim bead 35' at its upper open end, and near its lower end the container 13 is inwardly offset, as at 36, so as to have a sliding fit within the cylindrical upper portion 27 of the coffee basket 12, forming a peripheral shoulder 37 for seating upon the rim bead 28 of the coffee basket.

The coffee basket 12 and water container 13 may both be formed of sheet metal or the like, and the bottom wall 38 of the water container may be centrally, downwardly offset, as indicated at 39, and provided with apertures 40 as in usual practice.

The cover 14, for the water container, may also be formed of sheet metal or the like, and is provided at its lower open side with the curved peripheral flange 41 adapted to set upon the rim bead 36 of the water container. The usual handle 42 is shown upon the top of the cover 14 for removing or replacing the same. The usual handles 43 may be provided upon the water container 13 for removing the same from the coffee basket and replacing the same thereon.

All of the parts above described are of conventional and well known construction in "Drip-O-Lator" coffee urns as made and sold by applicant's assignee, and in themselves form no part of the present invention.

The extension ring to which the invention pertains is indicated generally at 44 and comprises a cylindric ring 45 formed of sheet metal or the like, having the out-turned rim bead 46 at its upper edge upon which the rim bead 28 of the coffee basket 12 is adapted to seat, the cylindric upper portion 27 of the coffee basket having a sliding fit within said cylindric ring 45.

At a point spaced from its lower edge, the extension ring is inwardly offset at 47 so as to have a sliding fit within the open upper end of the liquid coffee reservoir 11, forming a peripheral shoulder 48 adapted to seat upon the rim bead 23 of the reservoir. The lower end of the reduced portion 47 of the extension ring may terminate in the curved inturned flange 49.

It will be evident from the above that by interposing the extension ring 44 between the upper end of the liquid coffee reservoir 11 and the coffee basket 12, the height of the reservoir is thus increased and its capacity is proportionately increased. The extension ring may be formed of greater or less height, depending upon the amount of increased capacity desired.

It will be seen that by the use of this extension ring a simple, inexpensive and efficient means is provided for easily and readily increasing the capacity of a conventional drip coffee urn, by merely interposing the extension ring between the upper end of the liquid coffee receptacle and the ground coffee basket, in the manner shown in Figs. 1 and 2, and in the event it is not desired to use the extension ring the same may be easily and quickly removed and the ground coffee basket and water container assembled upon the upper end of the liquid coffee reservoir in usual manner.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In a drip type coffee urn comprising a liquid coffee reservoir having an open upper end, a detachable extension ring having a reduced lower end adapted to fit within the open upper end of the reservoir, an intermediate peripheral shoulder on the extension ring adapted to rest on the upper end of the reservoir, said extension ring having an open upper end of the same diameter as the open upper end of the reservoir, a detachable perforate ground coffee basket having an open upper end of the same external diameter as the internal diameters of the open upper ends of the reservoir and the extension ring, and having a peripheral shoulder at its upper end, and a water container with perforate bottom wall and having a reduced lower end portion adapted to fit within the open upper end of the ground coffee basket and having a peripheral shoulder resting upon the upper end of the ground coffee basket, whereby the upper end portion of the ground coffee basket may be received in the open upper end of the liquid coffee reservoir with the peripheral shoulder of the ground coffee basket resting upon the upper end of the reservoir, and the lower end of the water container may be inserted into the open upper end of the coffee basket, and whereby the capacity of said liquid coffee reservoir may be increased by inserting the reduced lower end of the extension ring within the open upper end of the liquid coffee reservoir with peripheral shoulder of the extension ring resting upon the upper end of the reservoir, the upper end portion of the ground coffee basket may be inserted into the open upper end of the extension ring with the peripheral shoulder of the ground coffee basket resting upon the upper end of the extension ring, and the reduced lower end of the water container may be inserted into the open upper end of the ground coffee basket.

2. In combination with a drip type coffee urn comprising a liquid coffee urn comprising a liquid coffee reservoir having an open upper end, a detachable, perforate ground coffee basket having an open upper end of the same external diameter as the internal diameter of the open upper end of the reservoir and a peripheral shoulder at the upper end of the ground coffee basket adapted to rest on the upper end of the reservoir, and a water container with a perforate bottom wall and having a reduced lower end portion adapted to fit within the open upper end of the ground coffee basket, a detachable extension ring having a reduced lower end adapted to fit within the open upper end of the reservoir, an intermediate peripheral shoulder on the extension ring adapted to rest on the upper end of the reservoir, said extension ring having an open upper end of the same diameter as the open upper end of the reservoir, whereby the ground coffee basket may be removed from the reservoir and inserted into the open upper end of the extension ring, and the reduced lower end of the extension ring may be inserted into the open upper end of the reservoir, so as to locate the ground coffee basket at a higher point within the reservoir thus increasing the capacity of said reservoir.

References Cited in the file of this patent

UNITED STATES PATENTS

| 855,842 | Dowe | June 4, 1907 |
| 946,578 | Nather | Jan. 18, 1910 |
| 1,549,043 | Meyer | Aug. 11, 1925 |
| 1,743,925 | Krause | Jan. 14, 1930 |
| 2,052,476 | Koch | Aug. 25, 1936 |

FOREIGN PATENTS

| 15,876 | Great Britain | 1912 |
| 117,807 | Austria | May 26, 1930 |
| 724,292 | Germany | Aug. 22, 1942 |